United States Patent
Lee et al.

(10) Patent No.: US 11,567,733 B2
(45) Date of Patent: Jan. 31, 2023

(54) SYSTEM, METHOD AND APPARATUS FOR RACE-CONDITION TRUE RANDOM NUMBER GENERATOR

(71) Applicant: Intel Corporation, Santa Clara, CA (US)

(72) Inventors: Yee Hui Lee, Pulau Pinang (MY); Boon Hong Oh, Bukit Mertajam (MY); David Johnston, Hillsboro, OR (US); David Wheeler, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 383 days.

(21) Appl. No.: 16/849,103

(22) Filed: Apr. 15, 2020

(65) Prior Publication Data
US 2021/0286594 A1    Sep. 16, 2021

(51) Int. Cl.
G06F 7/58    (2006.01)
G06F 15/78    (2006.01)

(52) U.S. Cl.
CPC .......... G06F 7/588 (2013.01); G06F 15/7807 (2013.01)

(58) Field of Classification Search
CPC ....................................................... G06F 7/588
See application file for complete search history.

(56) References Cited

U.S. PATENT DOCUMENTS

| | | | | |
|---|---|---|---|---|
| 2012/0081143 A1* | 4/2012 | Behrends | ................ | G06F 7/588 326/8 |
| 2014/0351305 A1* | 11/2014 | Hamilton | ................ | G06F 7/588 708/251 |
| 2020/0241843 A1* | 7/2020 | Hershman | ................ | G06F 7/588 |
| 2021/0026603 A1* | 1/2021 | Wu | ........................ | H04L 9/085 |

OTHER PUBLICATIONS

Altera, "Advanced Synthesis Cook", pp. 14-4-14-5 and cover page. (Year: 2011).*

* cited by examiner

*Primary Examiner* — Chuong D Ngo
(74) *Attorney, Agent, or Firm* — Spectrum IP Law Group LLC (57) ABSTRACT

The disclosure relates to systems, methods and devices to provide race-condition true random number generator (TRNG) for soft intellectual property (IP) in field-programmable gate arrays (FPGAs). In an exemplary embodiment, a pair of long adder chains are raced against one another to complete a full cycle. Due to variances in the silicon, different chains will win each race at different times and thereby produce entropy. A calibration circuit can be used to set up the adder chains in an appropriate initial state to maximize the entropy produced. This structure has been found to be robust to layout changes, and the use of two such adder-chain-pairs reduces interference from other structures. Among others, the soft IP makes adding a robust TRNG to an FPGA much easier without concerns for how the structures are laid out or what other IP is nearby in the layout. The disclosed embodiments reduces the effort to add a TRNG to an FPGA design and improves the robustness of the TRNG making the design FIPS certifiable.

26 Claims, 7 Drawing Sheets

SYSTEM, METHOD AND APPARATUS FOR RACE-CONDITION TRUE RANDOM NUMBER GENERATOR

FIELD

The present disclosure generally relates to system. method and apparatus for race-condition true random number generator. More particularly, an embodiment generally relates to systems, methods and devices to provide race-condition true random number generator for soft intellectual property (IP) in field-programmable gate arrays (FPGAs).

BACKGROUND

Despite years of active research, designing a robust digital random number generator on FPGA remains a challenge. Although ring oscillator is commonly deployed as entropy source on FPGA, ring-oscillator-based designs are generally vulnerable to frequency injection attack. Also, when multiple ring oscillators are used there is a tendency for the multiple ring oscillators to lock to each other.

True Random Number Generators (TRNGs) are susceptible to layout in silicon devices. Placement of Ring Oscillators (ROs) and other true random sources often have very different behaviors depending on the structures around them. Such behaviors create a problem when designers create Soft-IP libraries. A technical challenge has focused on how to make and/or place the TRNG in a way that permit production of acceptable random outputs. Additionally, there are national standards (commonly FIPS 140-2 and NIST SP 800-90A) that require specific structures and demand specific measurement and guarantees of random output. These challenges plague the conventional RNG designs.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Figure 1:
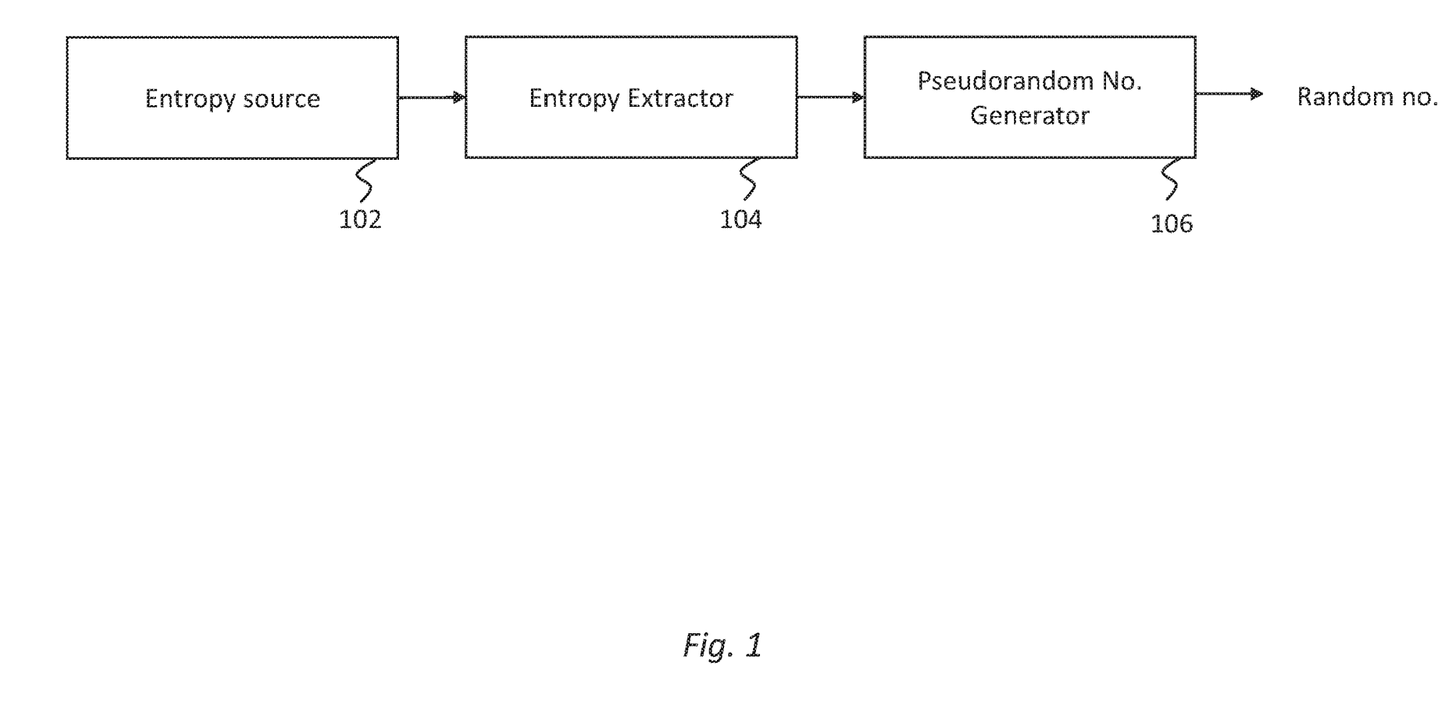
FIG. 1 shows the general structure of a digital random number generator.

Random number generator (RNG) is vital in a wide range of applications, especially in cryptographic security systems. A digital random number generator (DRNG) generally consists of entropy source, entropy extractor and pseudo-random number generator. FIG. 1 shows the general structure of a DRNG. The DRNG of FIG. 1 includes entropy source 102, entropy extractor 104 and pseudorandom number generator 106.

The entropy sources are physical systems (usually electrical circuits) that obtain noise from environment and convert it into random bits. Thus, increasing noise is desired. Ideally, the generated random bits are independent and identically distributed (IID). However, entropy sources can never achieve this property directly in real-world implementation. Thus, entropy extractor is required to convert the partially entropic outputs from entropy source into data that is close to perfectly uniform and nondeterministic. Outputs from entropy extractor, which are often in low bit rate, are then used to seed a cryptographically secure pseudorandom number generator for random number generation. The role of the pseudorandom number generator is to ensure random numbers that are sufficiently good for cryptography can be produced on demand.

In an exemplary implementation according to certain disclosed embodiments, an AES128-based cipher block chaining mode message authentication code (CBC-MAC) was implemented as entropy extractor. An AES128-based counter mode deterministic random bit generator (CTR-DRBG) was implemented for the pseudorandom number generator. As the entropy extractor and pseudorandom number generator were implemented with compliance to National Institute of Standards and Technology (NIST) specifications, details of relevant algorithms and designs are not covered in this disclosure.

Differing from custom entropy source on application-specific integrated circuit (ASIC), FPGA-based entropy source implementations subject to variations across different FPGA device families and device parts as well as logic placements due to different fitter seeds. The impact of variation becomes more significant when the entropy source module is integrated with other logics to form real-world practical systems, such as for video and vision, automotive, and artificial intelligence applications. This poses an additional design challenge to FPGA-based entropy source implementations as compared to the conventional ASIC-based implementations, where the layout is tested and locked down prior to fabrication.

Various techniques have been studied in literature for DRNG entropy source implementation using FPGA. The most common approach is based on ring oscillator, mainly due to its simplicity for digital logic deployment. Although a counter that is enabled by sampled bit from a ring oscillator produces generally non-repeatable outputs, the use of single ring oscillator is inadequate to act as an entropy source for cryptographic security applications. Hence, more sophisticated variants of ring-oscillator such as elementary ring oscillator (ERO), multi-ring oscillator (MURO), and metastable phase collapse ring oscillator (METARO) have been conventionally proposed. Ring oscillators are generally vulnerable to frequency injection attack and multiple ring oscillators tend to lock to each other, which results in the generation of repetitive/predictable outputs.

Conventional phase-locked loop (PLL)-based entropy source have also been used where randomness is harvested from the intrinsic jitter. But experience shows that manual/fixed placement is required by all the aforementioned entropy sources to ensure their functionality, otherwise PLL designs produce predictable output bits when compiled using certain fitter seeds. However, fixed logic placement of a DRNG design across different FPGA device parts is technically infeasible. Since the requirement to support for various FPGA device parts is particularly important for deployment in soft intellectual properties (IPs), it is critical to design a placement unconstrained DRNG entropy source.

In a conventional application, a race-condition-based entropy source was proposed where a dynamically-controlled race condition was setup through two symmetric carry chains. The entropy source presented allowed for free placement on FPGA and run-time recalibration. However, the use of von Neumann filter that discarded repeating output bits is unsuitable for non-IID data and direct removal of the von Neumann filter results in output bits of long consecutive zeros/ones (low entropy). Furthermore, it was observed that such entropy source has the tendency of not producing any random outputs for certain fitter seeds if the propagation delay of the two carry chains varies significantly.

The disclosed embodiments provide for placement of unconstrained race-condition-based entropy source that suitable for cryptographic security applications. The disclosed embodiments introduce an online health test with observation scheme to make sure random bits with ensured entropy are generated. In an exemplary embodiment, a pair of long adder chains are raced against one another to complete a full cycle. Due to variances in the silicon, different chains will win each race at different times and thereby produce entropy. A calibration circuit can be used to set up the adder chains in an appropriate initial state to maximize the entropy produced. This structure has been found to be robust to layout changes, and the use of two such adder-chain-pairs reduces interference from other structures.

In some applications, structural optimization can be applied to facilitate placement of the variable carry chains (without any special constraints or setting) for minimizing the chances of the entropy source for not producing any valid random bits. As provided below, the disclosed design was tested and implemented on the core fabric of Intel Arria 10® and Stratix 10® FPGA devices. Based on conducted experiments across different fitter seeds and various operating conditions namely long hours running, dynamic clock frequency switching, and process, voltage, temperature (PVT) testing, the proposed design consistently produced random bits with ensured entropy, where no locked-up condition (i.e., no valid random bit is produced due to unavailability of good calibration setting) was observed.

Figure 2:
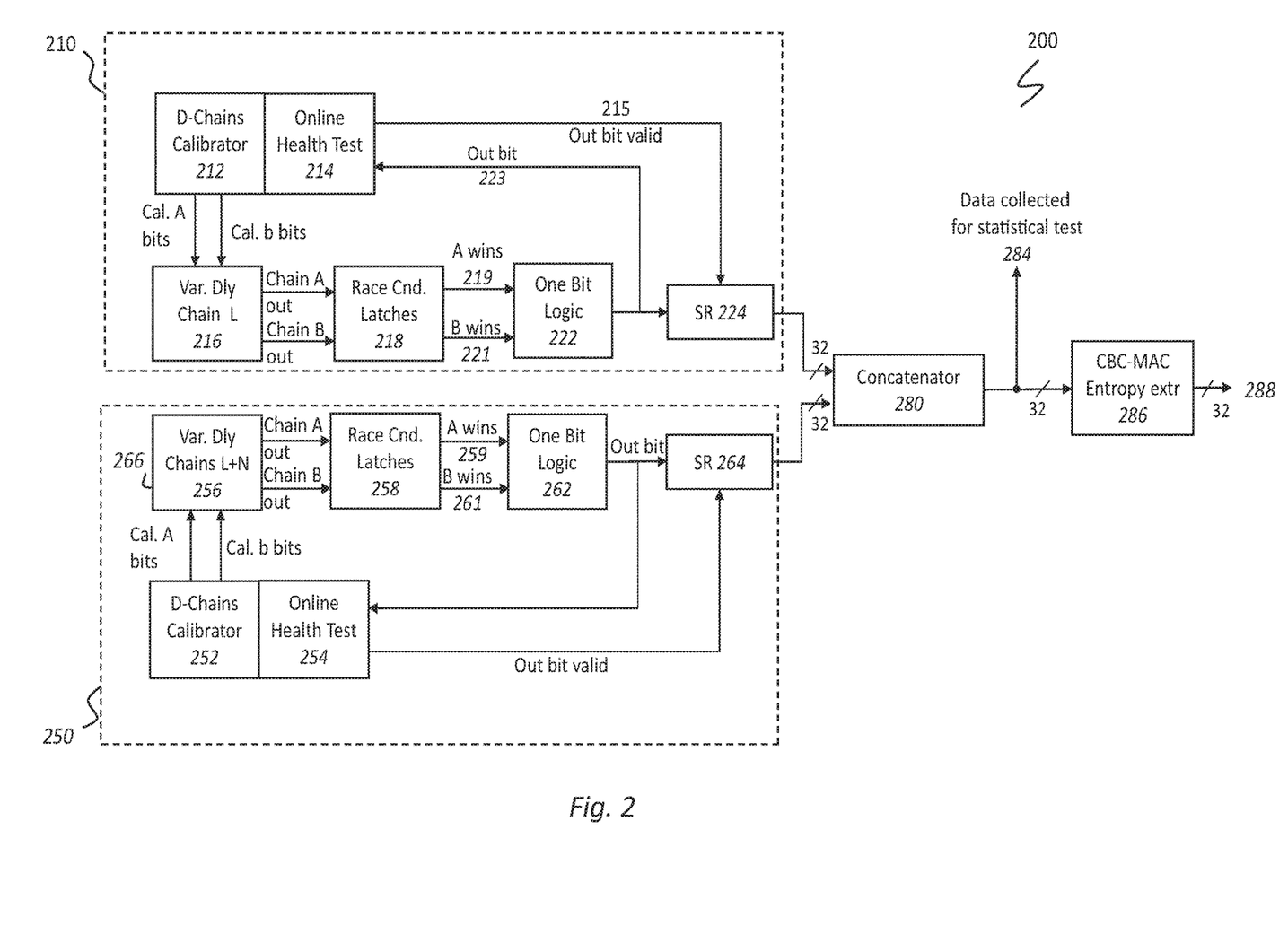
FIG. 2 schematically illustrates top-level system diagram of an exemplary true random number generator according to one embodiment of the disclosure.

FIG. 2 schematically illustrates top-level system diagram of an exemplary TRNG entropy system 200 according to one embodiment of the disclosure. In FIG. 2, two independent race condition circuits 210 and 250 are deployed to enhance the overall strength of the entropy source module. Specifically, independent race condition circuits 210 and 250 work in parallel to provide the TRNG entropy system. Race condition circuit 210 is identified as the first race condition circuit and race condition circuit 250 is identified as the second race condition circuit. In the embodiment of FIG. 2, the first and the second race condition circuits are substantially identical; though it should be noted that the race condition circuits may not be identical without departing from the disclosed principles. For brevity, the operation of system 200 will be discussed below in reference to the first race condition circuits 210. It is understood that the component of the second race condition circuit 250 are similar to those of the first race condition circuit 210.

Each race condition circuit 210, 250 comprises at least one variable delay chain circuit 216, 256. Race condition circuit 210, includes variable delay chain 216. The variable delay chain circuitry will be discussed further below in relation to FIGS. 3A and 3B. In one embodiment, the variable delay chains circuit (216, 256) can be an adder. The variable delay chain circuit 216 of race condition circuitry 210 comprises chains of length, L. The variable delay chain circuit 256 has a chains of length, L+N. In one embodiment, L and N are non-consecutive prime numbers. As will be discussed, the chain lengths can be selected arbitrarily to make up the desired circuit. The outputs of variable delay chains 216 are Chain A and Chain B output and are received at race condition latches circuitry 218. The race condition latches circuitry 218 (258), among others, serves to determine the race outcome which may be one of the following states: (1) a chain output wins the race (i.e., which chain output is received first); (2) both chain outputs win (i.e., both chain outputs are received at the same time); or (3) no chain output wins (i.e., both chain outputs are received at almost the same time, latch circuit is not able to capture which is received first).

The outputs from the race condition latches circuit 218 include outputs 219 and 221 corresponding, respectively, to the conditions 'A Wins' and 'B wins'. The outputs are received at one bit logic 222 (262). One bit logic 222 (262) may comprise an XOR gate that provides an output bit 223. The output bit can be a single bit defining the winner of the variable delay chain race of circuitry 216. By way of example, if one of the variable delay chain output wins, output 223 can be '1'. If neither wins or if both win, then the output 223 may be '0'. In this manner, all possible results of the race can be outputted in a binary signal.

The output bit 223 is then directed to online health test 214, delay chains calibrator 212 as well as to Shift Register (SR) 224. Shift register 224 (264) accumulates and releases 32 bits at a time to concatenator 280.

Output bits 223 may include distortion and noise which may cause loss of randomness. As stated, increasing noise and distortion into the system improves randomness and is desired. To identify and remediate this condition, output bit(s) 223 are received at online health test circuitry 214. Online health test circuitry 214 assesses the health of the output bits to ensure randomness. If output bits fail the test, then delay chain calibrator 212 is engaged to recalibrate variable delay chain circuits 216. Recalibration may be implemented by delay chain calibrator 212 sending adjusted calibration A bits and calibration B bits to the variable delay chain 216. The calibration process is discussed further below.

Delay chain calibrators 212, 252 and online health test 214, 254 play a vital role to ensure valid outputs are only produced if unstable setting is found and good quality random numbers are generated. Recalibration of the delay chains is triggered otherwise. In some embodiments, observation period is introduced to ensure consistency of the unstable setting where 'no bad patterns' is detected for a certain duration prior to the transition from 'calibrating mode' to 'operating mode'. In one embodiment, no valid output is produced during calibrating mode where valid signal is masked by adjusting bit (0 is operating mode; 1 is calibrating mode). When the race condition circuit is in operating mode, the online health test may continue to monitor the generated output bits. The circuit can transit from operating mode to calibrating mode if a bad pattern is detected. In one exemplary implementation, bad patterns can be defined as consecutive zeros/ones in one run as well as repeating segments or chunk between two runs.

If output bit 223 is valid, online health test circuit issues an output bit validation signal 215. Bit validation signal 215 instructs shift register 224 (262) that the data is valid. If not valid, the shift register will not load output bits 223 from one bit logic 222.

As stated, shift register 224 (264) accumulates output bits from one-bit logic 222 to provide a 32-bit string to concatenator 280. Concatenator 280 receives a similar 32 bits output from the second race condition circuit 250. Concatenator 280 concatenates the inputs by alternatingly taking 32-bit output from circuit 210 and 32-bit output from circuit 250. Thus, outputs from the two race condition circuits 210, 250 are concatenated prior to entropy extractor. Entropy extractor received 128-bit input entropy over 4 clock cycles (4*32-bit where 32-bit from 210+32-bit from 250+32-bit from 210+32-bit from 250). For every 128-bit outputs from the concatenator, 64 bit are taken from first race condition circuit 210 and 64-bit are taken from second race condition circuit 250. As output bit rate of first race condition circuit 250 and second race condition circuit 250 varies, shift registers 224, 262 are always loaded with latest valid out bit from respective circuits 210, 250 while waiting for its turn to be supplied as output. In one embodiment, variable delay chains 216, 256 and race condition latches 218, 258 are the core of the entropy source.

Output 284 of concatenator 280 represents data collected for statistical test. Output 284 is also directed to DBC-MAC Entropy extractor 286 which receives 128-bit inputs; 32-bit chunk each over 4 clock cycles and outputs in 128-bit segments (32-bit chunk each over 4 clock cycles) as shown by output 288.

Figure 3A:
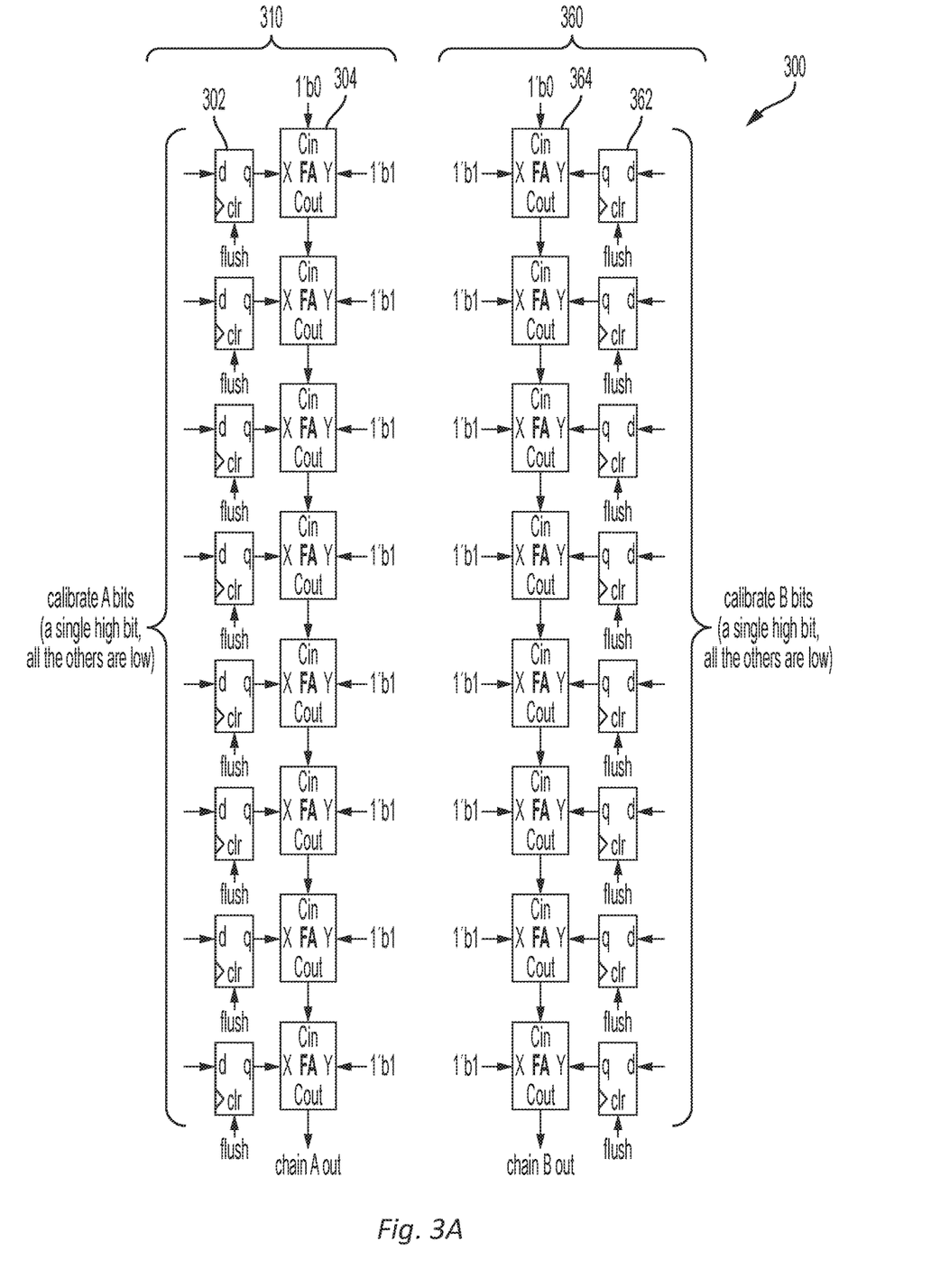
FIG. 3A illustrates an exemplary variable delay chains circuitry according to one embodiment of the disclosure.

FIG. 3A illustrates an exemplary variable delay chains circuitry according to one embodiment of the disclosure. Specifically, FIG. 3A shows block diagram of the variable delay chains, which are composed of two symmetric carry chains 310 and 360. Each of carry chain circuits 310 and 360 comprise substantially identical components. For brevity, components of circuit 310 will be discussed. Cary chain circuit 310 comprises register bank 302 and adder bank 304. Similarly, carry chain circuit 360 comprises register bank 362 and adder bank 364.

The basic delay element is an adder chain 304, 364 that is made up of full adders (FA), where each full adder takes input from respective registered calibration bit, constant bit "1", and carry out from previous full adder in the chain (if any). It is noted that the calibration bits input (for each delay chain) always contain only a single bit "1" and all the other bits are "0", where the position of the bit "1" is tuned by the delay chains calibrator.

During idle state, flush signal is set to "1" and fed to each of the registers of the register bank 202. Thus, all the calibration bits registers that are connected to the adder chains are cleared to "0". In this case, chain A out and chain B out are always zeros. On the other hand, a race condition is setup when the flush signal is set to "0" and the calibration bits are loaded to respective registers. In this case, the chain A out and chain B out signals become high when the carry bit "1" propagated down to the end of respective chains. Timing of the chain out signal transitions from "0" to "1" is determined by the propagation delay between the register where the calibration bit is set to "1" and the end of the delay chain. In one embodiment, the system will adjust at least one set of the calibration bits during calibrating mode. But, during operation mode, the system will always feed respective calibration bits to both Chain A and Chain B registers when a race is setup.

Figure 3B:
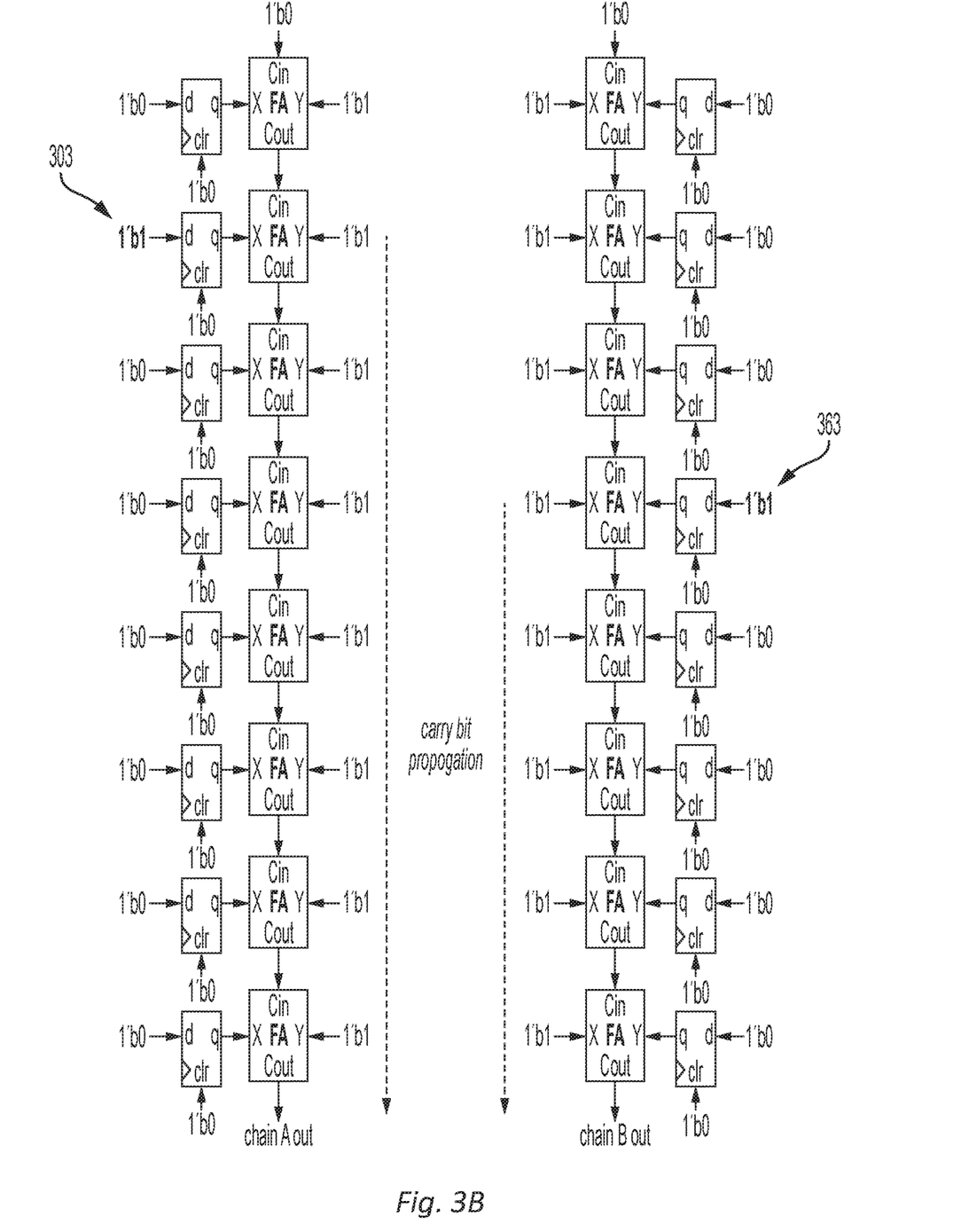
FIG. 3B depicts an example of carry bit propagation of FIG. 3A when a race condition is setup.

FIG. 3B depicts an example of carry bit propagation of FIG. 3A when a race condition is setup. In FIG. 3B, input to the left adder circuit occurs at location 303 while input to the right adder circuit occurs at location 363. Although the two carry chains look identical in the block diagram, it is important to note that the propagation delay from one full adder to the other can vary significantly due to their logic placement on FPGA. This implies that for the example given in FIG. 3A, it is possible that chain A out transition from "0" to "1" earlier than chain B out due to routing delay in chain B is more dominant compared to chain A. This delay can be caused by anomalies due to, for example, material structure (e.g., $SiO_2$), thermal noise, electrical noise and other material limitations.

In some embodiments, a latch circuit (see FIG. 4) may be used to detect which chain produces a "1" first at the chain out signal. If chain A out is detected to produce "1" first, then A wins register is set to "1" and B wins register is set to "0", and vice versa. However, if the arrival time of both chains are sufficiently close, it is possible that both latches are set to "1" or none of them is set to "1". Trial complete signal indicates end of race when both delay chains eventually produce output "1" at the chain out signals, thus the race result is valid. The output registers and the chain input registers are using the same clock, and the latch circuit is intended to meet the timing of one clock cycle.

Figure 4:
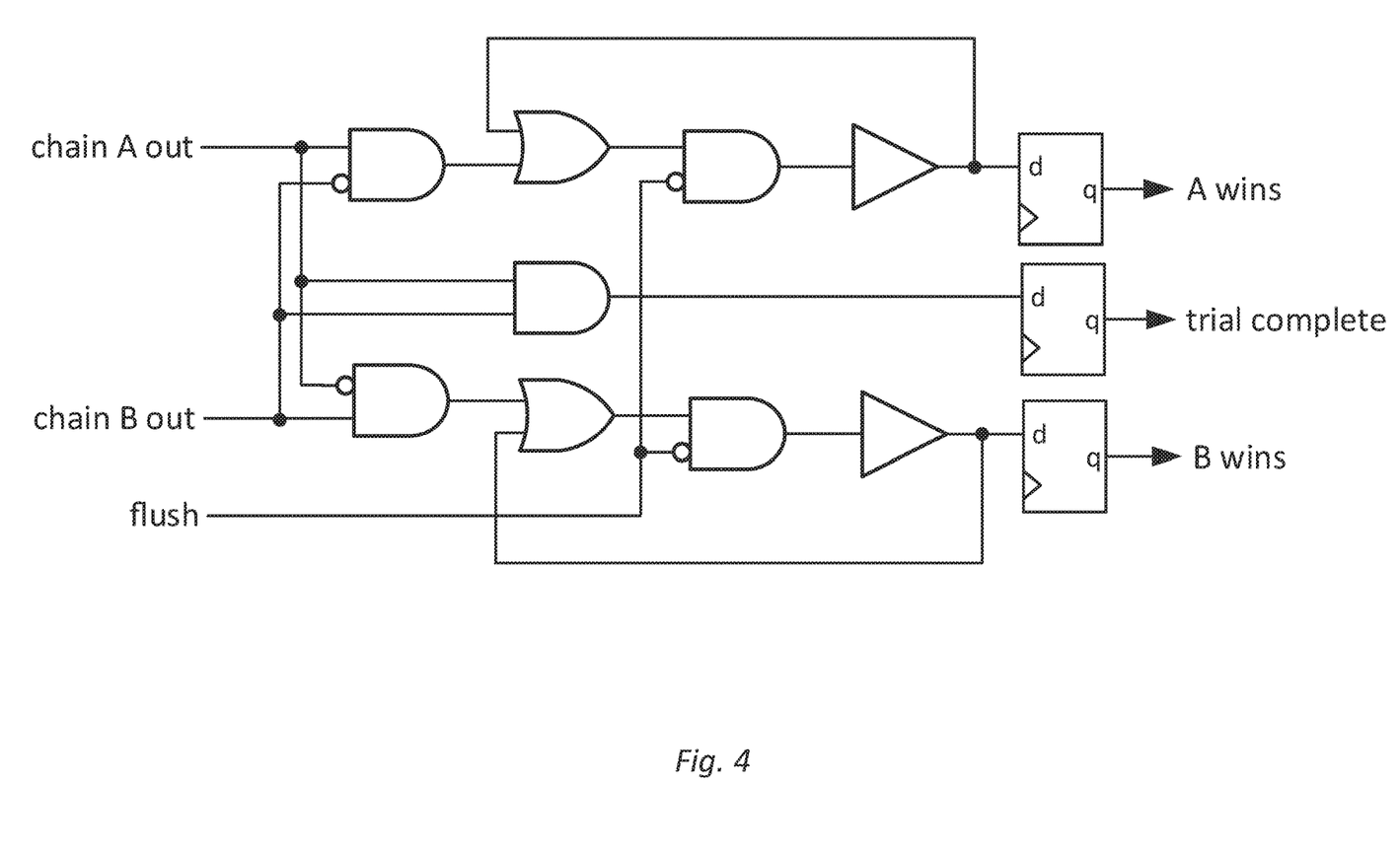
FIG. 4 is an exemplary latch circuit to be used with the disclosed embodiments.

FIG. 4 is an exemplary latch circuit used to detect which chain produces a "1" first at the chain-out signal. The latch circuit is identified in FIG. 2 as latch circuit 218, 258. If chain A out is detected to produce "1" first, then A wins register is set to "1" and B wins register is set to "0", and vice versa. However, if the arrival time of both chains are sufficiently close, it is possible that both latches are set to "1" or none of them is set to "1". Trial complete signal indicates end of race when both delay chains eventually produce output "1" at the chain out signals, thus the race result is valid. The output registers and the chain input registers are using the same clock, and the latch circuit is intended to meet the timing of one clock cycle.

As stated with reference to online health test circuits 214 and 254 of FIG. 2, to produce random bits it is critical for a race condition circuit to identify a pair of calibration bits for the two delay chains that result in unstable race outcomes. In a stable setting, the race results are either always A wins only or always B wins only as the propagation delay of one chain is significantly longer than the other, thus predictable output bits are produced. On the other hand, in an unstable setting, the propagation delay of one chain is sufficiently close with the other, thus various race results, i.e., potential combinations of A wins only, B wins only, both win and neither wins, can be produced under the same calibration setting and random bits are generated based on the race results. It is important to note that unstable settings tend to change over time and different operating conditions, hence continuous online health test and delay chains calibration are required to identify good unstable setting for random bits generation.

In one embodiment, the role of a delay chains calibrator is to tune the calibration bits of the two delay chains at run time based on the online health test result. A set of calibration bits for a delay chain contains a single bit "1" and the rest of the bits are zeros, where the total number of calibration bits is determined by the chain length. The delay chains calibrator sweeps through arbitrary calibration setting for the two delay chains until a good unstable calibration setting that passes the online health test is identified. Since a calibration setting does not stay unstable all the time, the delay chains calibrator often transitions between calibrating mode (no valid output bits are produced) and operating mode (valid random output bits are produced).

As discussed in relation to FIG. 2, certain embodiments provide online health test observations scheme. The online health test checks for bad patterns namely long runs (consecutive zeros or ones) and repeating chunks on the output bit string. The online health test is determined as failing if any bad pattern is detected on the output bit string, whereas the test is determined as passing if no bad pattern is found on the output bit string for an observation period. The observation scheme is introduced to filter out some borderline unstable settings, where such settings produce the same race results for most of the races and result in low entropy random bits.

Figure 5:
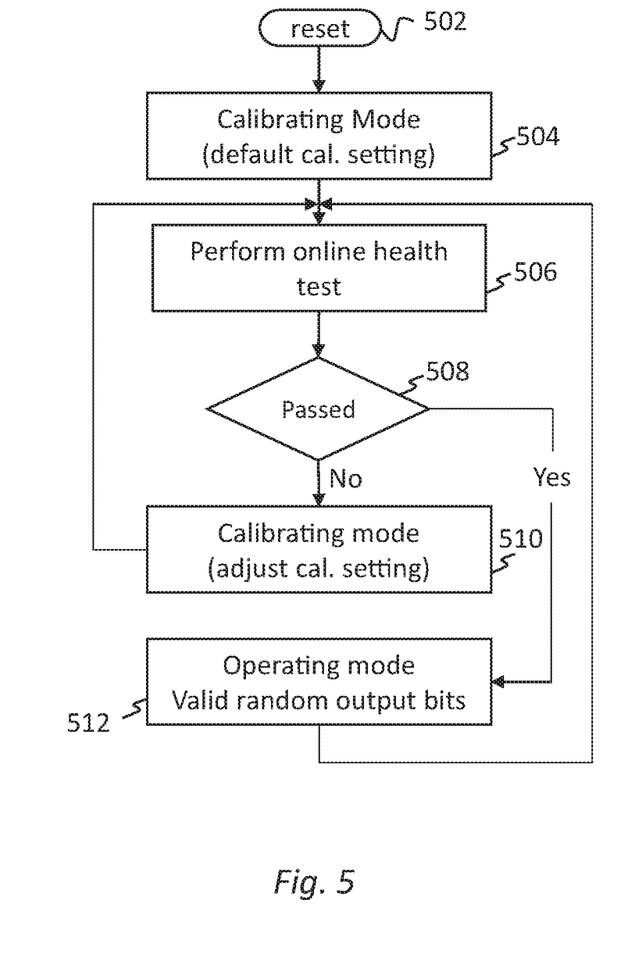
FIG. 5 depicts flowchart of the online test of the delay chains calibrator according to one embodiment of the disclosure.

FIG. 5 depicts flowchart of the online test of the delay chains calibrator according to one embodiment of the disclosure. The process of FIG. 5 starts at step 502 where the system is reset. At step 504, the system goes to its default calibration setting. At step 506, the system implements an online test. The online test may be triggered by events, such as, determination of non-random numbers. At step 508, determination is made as to whether the health test passes. The determination can be done, for example, by comparing noise level in the out bit 223 with a predefined threshold. If the health test does not pass, at step 510, calibration mode is activated and the calibration setting is adjusted as discussed in relation to FIG. 5. Thereafter, the flowchart returns to step 506 and the process is repeated. On the other hand, if the health test passes, the process proceeds to step 512 where operating mode is activated and valid random output bits are provided to the system. Thereafter, the flowchart returns to step 506 where additional online health testing is performed.

In an exemplary implementation, the disclosed race condition circuit was implemented on an FPGA core fabric. The results show that most of the calibration settings produce consistent race results; that is, either always A wins only or always B wins only. These stable settings produced predictable race outcomes mainly due to the fact that propagation delay of one chain (from the position of bit "1" in calibration bits to respective latch) is more dominant than the other. In such cases, no randomness is produced by the race condition circuit and output valid signal is always negated.

On the other hand, there were notable number of calibration settings that resulted in unstable race outcomes (i.e., potential mixture of A wins only, B wins only, both win and neither wins). Unstable settings produced randomness in race results due to the arrival time of the set carry bits to respective latches are adequately close. In such cases, slight changes in overall propagation delay (sum of individual logic cell delay and routing wire delay on the chain propagation path) due to thermal and electrical noise is sufficient to alter the race outcome. In short, source of randomness of the proposed race-condition-based entropy source was found to be thermal and electrical noise on FPGA.

The disclosed race-condition-based entropy source was further implemented and tested on Intel Arria 10® and Stratix 10® FPGA core fabric. The register-transfer level (RTL) design was coded using Verilog hardware description language (HDL). Intel Quartus Prime Pro Edition v18.1® software was used for design compilation.

Since the race condition behavior for random bits generation is depending on thermal and electrical noise on FPGA, functional simulation of the proposed entropy source module was infeasible. Hence, the proposed design was compiled and loaded onto the FPGA development kit for functional verification. Signal Tap Logic Analyzer was used to observe and monitor the behavior of the race condition circuit at run time. In addition, random bits generated by the proposed entropy source was stored in on-chip random access memory (RAM) and retrieved using In-System Memory Content Editor for analysis.

To analyze quality of the random bits generated by the proposed race-condition-based entropy source, 10 Mbytes output bits were collected for variable delay chains of chain length 37 and 57, respectively. For this design, the online health test parameters observation loops was set to 30, long runs checking was set to 16-bit and repeating chunk checking was set to 16-bit. Analysis was performed based on the output bits generated from individual race condition circuit. Results obtained from random number analysis software and are shown in Tables 1 and 2, respectively.

TABLE 1

Analysis results based on Fourmilab/John Walker random number test program. Meaningful columns given the bit width are highlighted. Ent computes min-entropy from the measured probability of the most common symbol as $-\log_2 (\max (P_i))$.

| Bit Width | Chain Length | Entropy | Min-Entropy Per Bit | Mean | Serial-Correlation | Longest Run Length |
|---|---|---|---|---|---|---|
| 1-bit | 37 | 0.999824 | 0.977647 | 0.492193 | 0.120384 | 30 |
| 1-bit | 57 | 0.999925 | 0.985409 | 0.494917 | 0.106091 | 30 |
| 8-bit | 37 | 7.826980 | 0.672702 | 125.287592 | 0.189795 | 4 |
| 8-bit | 57 | 7.859719 | 0.694233 | 126.173265 | 0.175215 | 5 |

TABLE 2

Analysis results based on NIST SP800-
90B non-IID entropy assessment tests.

| Chain Length | Min-Entropy Per Bit | Min (H_original, 8 X H_bitstring) |
|---|---|---|
| 37 | 0.472 | 3.781069 |
| 57 | 0.504 | 4.036784 |

Based on the results presented in Tables 1 and 2, random bits produced by the disclosed entropy source achieves estimated min-entropy of 0.47-bit, where these results support the SIPS certifiability of the design. In addition, a series of experiments were conducted to analyze the behavior of the proposed race condition circuit under different operating conditions namely long hours running, dynamic clock frequency switching, PVT testing, as well as design compilation of using up to 80 different fitter seeds. Experimental results showed that the disclosed design has a stable and consistent behavior for random bit generation across various operating conditions and different fitter seeds compilations.

Other than quality of the generated random bits, optimizing resource utilization is a concern in FPGA-based circuits. Table 3 shows resource utilization of the proposed race-condition-based entropy source on Intel Arria 10® FPGA device. For this design, variable delays chain of chain length 37 was selected for race condition circuit 1, and chain length 57 was selected for race condition circuit 2. The choice of chain length may be important to facilitate the placement of the variable delay chains onto FPGA logic array blocks (LABs). This is to ensure the overall propagation delay of one chain is close to the other, thus there are potentially more good unstable settings available for calibration. In summary, the proposed race-condition-based entropy source was shown to be a robust solution on FPGA with reasonable logic resource requirement.

TABLE 3

Resource utilization of proposed entropy source
on Intel Arria 10 ® FPGA device.

| | ALMs Needed | Combinational ALUTs | Dedicated Logic Registers |
|---|---|---|---|
| Resource Usage | 189.3 | 384 | 582 |

The disclosed race-condition-based entropy source overcomes the limitation of the conventional designs where fixed logic placement is required on the FPGA core fabric to ensure the entropy source functionality for random bits generation. The variable delay chains disclosed herein provide entropy source capable of compensating compile time logic placement variation due to different fitter seeds. In some embodiments, the race-condition circuit allows for online health test and run time calibration to search for good unstable setting to compensate for run time delay variations. The aforementioned characteristics may be critical for a resource efficient, robust delay-based DRNG entropy source implementation on FPGA.

In certain embodiments, improvements may be made on top of the race-condition entropy source design in: (a) The use of von Neumann filter, which may be unsuitable for non-DD data, is removed; (b) An online health test with observation scheme can be introduced to facilitate the generation of random bits with ensured min-entropy; (c) Two race condition circuits with different chain lengths can be implemented to provide a defense against signal injection attacks; (d) Structural optimization can be made to minimize the chances of not having good unstable setting within the range of calibrations; (e) Thorough analysis can be performed on the proposed entropy source, where a series of experiments are conducted under different operating conditions as well as compilations using different fitter seeds. Such improvements may be sufficient to enable the race-condition-based entropy source to meet min-entropy requirements for use in SP800-90 based RNGs and to render it suitable for cryptographic security applications.

Figure 6:
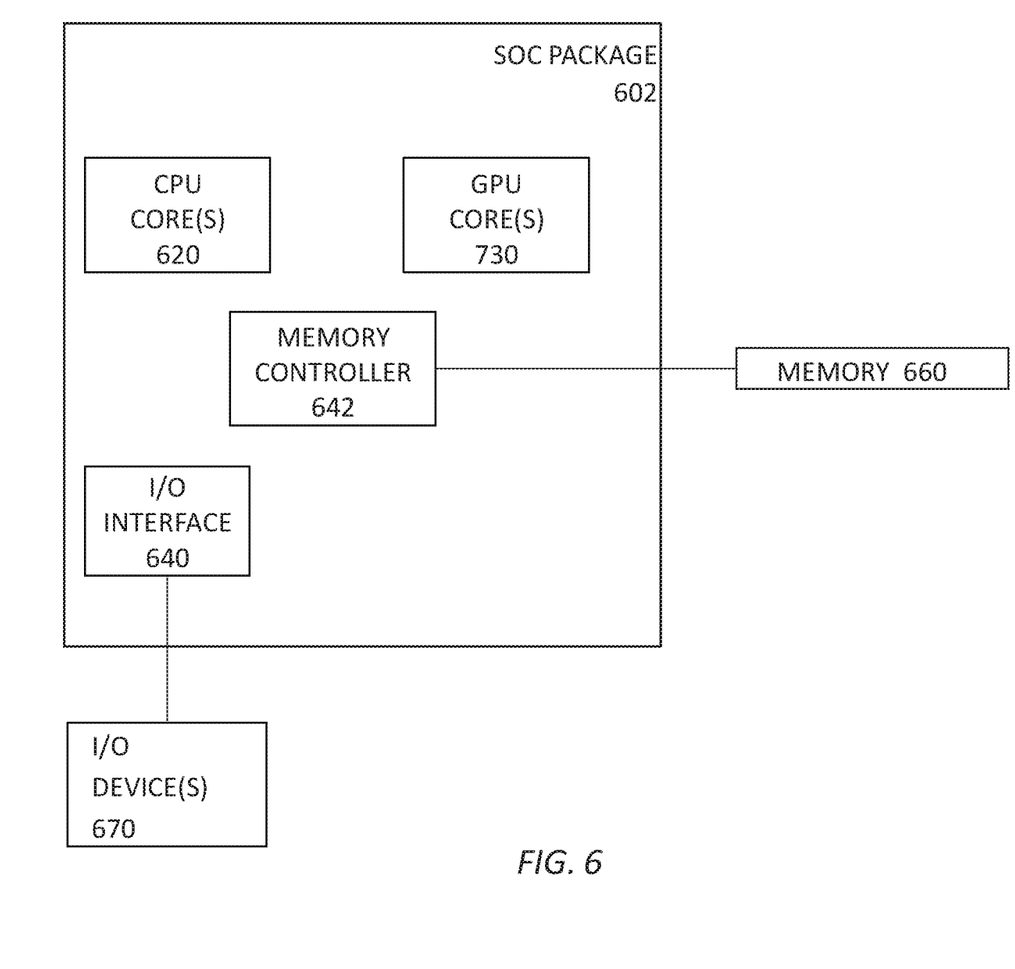
FIG. 6 illustrates a block diagram of an SOC package to implement a race-condition true random number generator according to an embodiment of the disclosure.

FIG. 6 illustrates a block diagram of an SOC package to implement a race-condition true random number generator according to an embodiment of the disclosure. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

SOC package 602 is coupled to a memory 660 via the memory controller 642. In an embodiment, the memory 660 (or a portion of it) can be integrated on the SOC package 602. The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. By way of example, memory 660 may store instructions for causing a TRNG system implemented on SOC package 602 to generate race-condition random numbers. CPU cores 620 may house the circuitry described in relation to FIGS. 2, 3A, 3B and 4. I/O interface 640 may communicate the output to the FPGA (not shown). In one embodiment, SOC 602 may be integrated with the FPGA (not shown). In another embodiment, SOC 602 may define an integrated, standalone, system.

In various embodiments, the operations discussed herein, e.g., with reference to FIGS. 1-5, may be implemented as hardware (e.g., logic circuitry with reference to FIGS. 1-4), software (including, for example, micro-code that controls the operations of a processor such as the processors discussed with reference to FIG. 5), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

The following example further illustrate embodiments of the disclosure. The examples are illustrative of the disclosed principles and are not limiting. Examples 1 relates to a system on chip (SOC) to generate substantially uniform, nondeterministic data stream, comprising: a first variable delay chain (VDC) circuitry having a first delay chain and a second delay chain, each of the first and the second delay chains further comprising a respective register array and an adder array, the first VDC circuitry to provide a first race output bit and a second race output bit; a race condition latch circuitry to select a race output winner from the first and the second race output bits; and a bit logic circuitry to receive the selected race output winner bit and provide an output bit corresponding to the selected race output; a register to receive and store output bits corresponding a plurality of selected race outputs, the register to provide an output bit stream periodically; a concatenator to interleave different output bit streams to provide a partially entropic output bit corresponding to a plurality of selected race outputs; and an entropy extraction circuitry to convert the partially entropic output bit signal into a substantially uniform, nondeterministic data stream.

The following example further illustrate embodiments of the disclosure. The examples are illustrative of the disclosed principles and are not limiting.

Example 1 relates to a system on chip (SOC) to generate substantially uniform, nondeterministic data stream, comprising: a first variable delay chain (VDC) circuitry having a first delay chain and a second delay chain, each of the first and the second delay chains further comprising a respective register array and an adder array, the first VDC circuitry to provide a first race output bit and a second race output bit; a race condition latch circuitry to select a race output winner from the first and the second race output bits; and a bit logic circuitry to receive the selected race output winner bit and provide an output bit corresponding to the selected race output; a register to receive and store output bits corresponding a plurality of selected race outputs, the register to provide an output bit stream periodically; a concatenator to interleave different output bit streams to provide a partially entropic output bit corresponding to a plurality of selected race outputs; and an entropy extraction circuitry to convert the partially entropic output bit signal into a substantially uniform, nondeterministic data stream.

Example 2 relates to the SOC of example 1, further comprising a second VDC circuitry having a third delay chain and a fourth delay chain, each of the third and the fourth delay chains further comprising a respective register array and an adder array, the second VDC circuitry to provide a third race output bit and a fourth race output bit.

Example 3 relates to the SOC of examples 1-2, wherein each of the first and the second VDC circuits has a chain length defined by the number of adders in each respective array.

Example 4 relates to the SOC of examples 1-3, wherein the first VDC circuitry has a chain length of L and the second VDC circuitry has a chain length of L+N, and wherein L and N are non-consecutive prime numbers.

Example 5 relates to the SOC of examples 1-4, wherein the concatenator alternatingly concatenates serial race output bits.

Example 6 relates to the SOC of examples 1-5, further comprising an online health test and calibration circuitry to identify noise in the partially entropic output bit and to calibrate at least one of the first delay chain and a second delay chain to remediate the noise.

Example 7 relates to the SOC of examples of 1-6, further comprising a delay chain calibration circuitry to induce calibration bits to one of the VDC circuitry to substantially synchronize response time between the first and the second delay chains.

Example 8 is directed to the SOC of example 1, wherein the race condition latch circuitry is configured to select a race output winner as a function of the duty cycle for the first and the second delay chains.

Example 9 is directed to the SOC of example 1, wherein the concatenator interleaves different outputs bit streams by alternatingly using output bits from different circuitries.

Example 10 is directed to a method to generate substantially uniform, nondeterministic data stream, comprising: generating a first race output bit from a first variable delay chain (VDC) circuitry and generating a second race output bit from a second VDC circuitry, wherein each of the first and the second VDC circuitry having a respective register array and an adder circuitry; selecting a race output winner from among the first and the second race output bits at a race condition latch circuitry; providing, at a bit logic circuitry, an output bit corresponding to the selected race output winner bit; storing output bits corresponding a plurality of selected race outputs at a shift register and providing an output bit stream periodically from the shift register; interleaving different output bit streams from a plurality of shift registers to provide a partially entropic output bit corresponding to the selected race outputs; and converting the partially entropic output bit signal into a substantially uniform, nondeterministic data stream at an entropy extraction circuitry.

Example 11 is directed to the method of example 10, further comprising periodically evaluating the output bits corresponding to the selected race output winner bits at an online health test circuitry to determine a noise level.

Example 12 is directed to method of prior examples, further comprising comparing the noise level with a predefined noise threshold.

Example 13 is directed to method of prior examples, calibrating at least one of the register arrays to substantially increase the noise level to increase randomness.

Example 14 is directed to the method of prior examples, further comprising inputting at least one calibration bit into the register array of one of the first or the second VDC circuitries during a calibration mode and continually providing calibration bits to the first or the second VDC circuitries during an operation mode.

Example 15 is directed to the of prior examples, further comprising affecting a carry bit propagation at one of the first or the second VDC circuitries to substantially increase the noise level.

Example 16 is directed to the of prior examples, further comprising alternatingly interleaving output bit steams corresponding to a plurality of VDC circuitry outputs.

Example 17 is directed to the method of prior examples, wherein selecting a race output winner further comprises selecting a race output winner as a function of the duty cycle for the first and the second delay chains.

Example 18 is directed to of the prior examples, wherein interleaving different output bit streams from a plurality of shift registers further comprises alternatingly using output bits from different circuitries.

Example 19 is directed to a random number generator system, comprising: a memory circuitry for storing a plurality of instructions; a processor in communication with the memory circuitry, the processor configured to execute a plurality of instructions, the instructions configured to cause the processor to: generate a first race output bit from a first variable delay chain (VDC) circuitry and generate a second race output bit from a second VDC circuitry, wherein each of the first and the second VDC circuitry having a respective register array and an adder circuitry; select a race output winner from among the first and the second race output bits; provide an output bit corresponding to the selected race output winner bit; store output bits corresponding a plurality of selected race outputs at a shift register and provide an output bit stream from the shift register; interleave different output bit streams from a plurality of shift registers to provide a partially entropic output bit corresponding to the selected race outputs; and convert the partially entropic output bit signal into a substantially uniform, nondeterministic data stream at an entropy extraction circuitry.

Example 20 is directed to the system of prior examples, wherein the instructions further cause the processor to periodically evaluate the output bits corresponding to the selected race output winner bits at an online health test circuitry to determine a noise level.

Example 21 is directed to the system of prior examples, wherein the instructions further cause the processor to compare the noise level with a predefined noise threshold.

Example 22 is directed to the system of prior examples, wherein the instructions further cause the processor to calibrate at least one of the register arrays to substantially increase the noise level.

Example 23 is directed to the system of prior examples, further comprising affecting a carry bit propagation at one of the first or the second VDC circuitries to substantially increase the noise level.

Example 24 is directed to the system of prior examples, further comprising alternatingly interleaving output bit steams corresponding to a plurality of VDC circuitry outputs.

Example 25 is directed to the system of prior examples, wherein selecting a race output winner further comprises selecting a race output winner as a function of the duty cycle for the first and the second delay chains.

Example 26 is directed to the system of prior examples, interleaving different output bit streams from a plurality of shift registers further comprises alternatingly using output bits from different circuitries.

While the principles of the disclosure have been illustrated in relation to the exemplary embodiments shown herein, the principles of the disclosure are not limited thereto and include any modification, variation or permutation thereof.

What is claimed is:

1. A system on chip (SOC) to generate substantially uniform, nondeterministic data stream, comprising:

a first variable delay chain (VDC) circuitry having a first delay chain and a second delay chain, each of the first and the second delay chains further comprising a respective register array and an adder array, the first VDC circuitry to provide a first race output bit and a second race output bit;

a race condition latch circuitry to select a race output winner from the first and the second race output bits; and a bit logic circuitry to receive the selected race output winner bit and provide an output bit corresponding to the selected race output;

a register to receive and store output bits corresponding a plurality of selected race outputs, the register to provide an output bit stream periodically;

a concatenator to interleave different output bit streams to provide a partially entropic output bit corresponding to a plurality of selected race outputs; and an entropy extraction circuitry to convert the partially entropic output bit signal into a substantially uniform, nondeterministic data stream.

2. The SOC of claim 1, further comprising a second VDC circuitry having a third delay chain and a fourth delay chain, each of the third and the fourth delay chains further comprising a respective register array and an adder array, the second VDC circuitry to provide a third race output bit and a fourth race output bit.

3. The SOC of claim 2, wherein each of the first and the second VDC circuits has a chain length defined by the number of adders in each respective array.

4. The SOC of claim 3, wherein the first VDC circuitry has a chain length of L and the second VDC circuitry has a chain length of L+N, and wherein L and N are non-consecutive prime numbers.

5. The SOC of claim 2, wherein the concatenator alternatingly concatenates serial race output bits.

6. The SOC of claim 5, further comprising an online health test and calibration circuitry to identify noise in the partially entropic output bit and to calibrate at least one of the first delay chain and a second delay chain to remediate the noise.

7. The SOC of claim 1, further comprising a delay chain calibration circuitry to induce calibration bits to one of the VDC circuitry to substantially synchronize response time between the first and the second delay chains.

8. The SOC of claim 1, wherein the race condition latch circuitry is configured to select a race output winner as a function of the duty cycle for the first and the second delay chains.

9. The SOC of claim 1, wherein the concatenator interleaves different outputs bit streams by alternatingly using output bits from different circuitries.

10. A method to generate substantially uniform, nondeterministic data stream, comprising:

generating a first race output bit from a first variable delay chain (VDC) circuitry and generating a second race output bit from a second VDC circuitry, wherein each of the first and the second VDC circuitry having a respective register array and an adder circuitry;

selecting a race output winner from among the first and the second race output bits at a race condition latch circuitry;

providing, at a bit logic circuitry, an output bit corresponding to the selected race output winner bit;

storing output bits corresponding a plurality of selected race outputs at a shift register and providing an output bit stream periodically from the shift register;

interleaving different output bit streams from a plurality of shift registers to provide a partially entropic output bit corresponding to the selected race outputs; and converting the partially entropic output bit signal into a substantially uniform, nondeterministic data stream at an entropy extraction circuitry.

11. The method of claim 10, further comprising periodically evaluating the output bits corresponding to the selected race output winner bits at an online health test circuitry to determine a noise level.

12. The method of claim 11, further comprising comparing the noise level with a predefined noise threshold.

13. The method of claim 12, calibrating at least one of the register arrays to substantially increase the noise level to increase randomness.

14. The method of claim 13, further comprising inputting at least one calibration bit into the register array of one of the first or the second VDC circuitries during a calibration mode and continually providing calibration bits to the first or the second VDC circuitries during an operation mode.

15. The method of claim 13, further comprising affecting a carry bit propagation at one of the first or the second VDC circuitries to substantially increase the noise level.

16. The method of claim 10, further comprising alternatingly interleaving output bit steams corresponding to a plurality of VDC circuitry outputs.

17. The method of claim 10, wherein selecting a race output winner further comprises selecting a race output winner as a function of the duty cycle for the first and the second delay chains.

18. The method of claim 10, wherein interleaving different output bit streams from a plurality of shift registers further comprises alternatingly using output bits from different circuitries.

19. A random number generator system, comprising:
a memory circuitry for storing a plurality of instructions;
a processor in communication with the memory circuitry, the processor configured to execute a plurality of instructions, the instructions configured to cause the processor to:
generate a first race output bit from a first variable delay chain (VDC) circuitry and generate a second race output bit from a second VDC circuitry, wherein each of the first and the second VDC circuitry having a respective register array and an adder circuitry;
select a race output winner from among the first and the second race output bits;
provide an output bit corresponding to the selected race output winner bit;
store output bits corresponding a plurality of selected race outputs at a shift register and provide an output bit stream from the shift register;
interleave different output bit streams from a plurality of shift registers to provide a partially entropic output bit corresponding to the selected race outputs; and
convert the partially entropic output bit signal into a substantially uniform, nondeterministic data stream at an entropy extraction circuitry.

20. The system of claim 19, wherein the instructions further cause the processor to periodically evaluate the output bits corresponding to the selected race output winner bits at an online health test circuitry to determine a noise level.

21. The system of claim 20, wherein the instructions further cause the processor to compare the noise level with a predefined noise threshold.

22. The system of claim 21, wherein the instructions further cause the processor to calibrate at least one of the register arrays to substantially increase the noise level.

23. The system of claim 22, further comprising affecting a carry bit propagation at one of the first or the second VDC circuitries to substantially increase the noise level.

24. The system of claim 19, further comprising alternatingly interleaving output bit steams corresponding to a plurality of VDC circuitry outputs.

25. The system of claim 19, wherein selecting a race output winner further comprises selecting a race output winner as a function of the duty cycle for the first and the second delay chains.

26. The system of claim 19, interleaving different output bit streams from a plurality of shift registers further comprises alternatingly using output bits from different circuitries.

* * * * *